United States Patent [19]

Orr et al.

[11] 3,980,351
[45] Sept. 14, 1976

[54] TRACK IDLER RECOIL SPRING ASSEMBLY AND METHOD FOR INSTALLATION AND REMOVAL

[75] Inventors: Bobby J. Orr; Donald L. Schaffner, both of Springfield; Bill A. Danner, Rochester, all of Ill.

[73] Assignee: Fiat-Allis Construction Machinery, Inc., Deerfield, Ill.

[22] Filed: Jan. 2, 1975

[21] Appl. No.: 538,034

[52] U.S. Cl. .................................. 305/10; 305/22
[51] Int. Cl.² .................................. B62D 55/30
[58] Field of Search .................. 305/10, 22, 30, 31, 305/32; 213/43; 180/5 R

[56] References Cited
UNITED STATES PATENTS

| | | | |
|---|---|---|---|
| 2,717,813 | 9/1965 | Gardner | 305/31 |
| 3,539,229 | 11/1970 | Scully | 305/10 |
| 3,574,418 | 4/1971 | Okabe | 305/10 |
| 3,792,910 | 2/1974 | Kaufman | 305/10 |
| 3,829,172 | 8/1974 | Oestmann | 305/10 |
| 3,841,715 | 10/1974 | Comer | 305/10 |

Primary Examiner—M. H. Wood, Jr.
Assistant Examiner—John A. Carroll
Attorney, Agent, or Firm—Thomas F. Kirby; Robert A. Brown

[57] ABSTRACT

A track idler recoil assembly is mounted on a crawler tractor for resiliently resisting longitudinal movement of a yoke-mounted track idler caused by track deflection. The assembly comprises a spring housing, open at one end and closed at the other, rigidly secured to the tractor track frame; a coiled compression type recoil spring within the spring housing; and means, including a pushrod and a hydraulic ram, to transmit force between the track idler yoke and the spring and to enable installation and removal of the spring in uncompressed condition. The pushrod is detachably connected to the idler yoke and extends through a hole in a rigid portion of the track frame. The hydraulic ram is located between the pushrod and the spring and is slideably supported in a tubular spring restraining member which is mounted on the spring housing and movable axially into the open end thereof to fixed position to hold the spring in a precompressed condition.

During installation, the uncompressed spring is located in the housing and the ram is disposed on the restraining member between the spring and the rigid portion of the track frame. The ram is then extended to precompress the spring and the spring restraining member is moved axially into engagement with the precompressed spring and is secured in a fixed position to hold the spring in precompressed condition. The ram is then retracted and the pushrod is secured to the idler yoke, whereupon the ram is again re-extended to engage the pushrod and the spring to serve as an incompressible link for transmission of force.

During removal, the ram is retracted, the pushrod is removed, the ram is re-extended between the spring and the rigid portion of the track frame to hold the spring precompressed, while the spring restraining member is moved axially out of engagement with the spring, and the ram is then retracted to decompress the spring.

10 Claims, 8 Drawing Figures

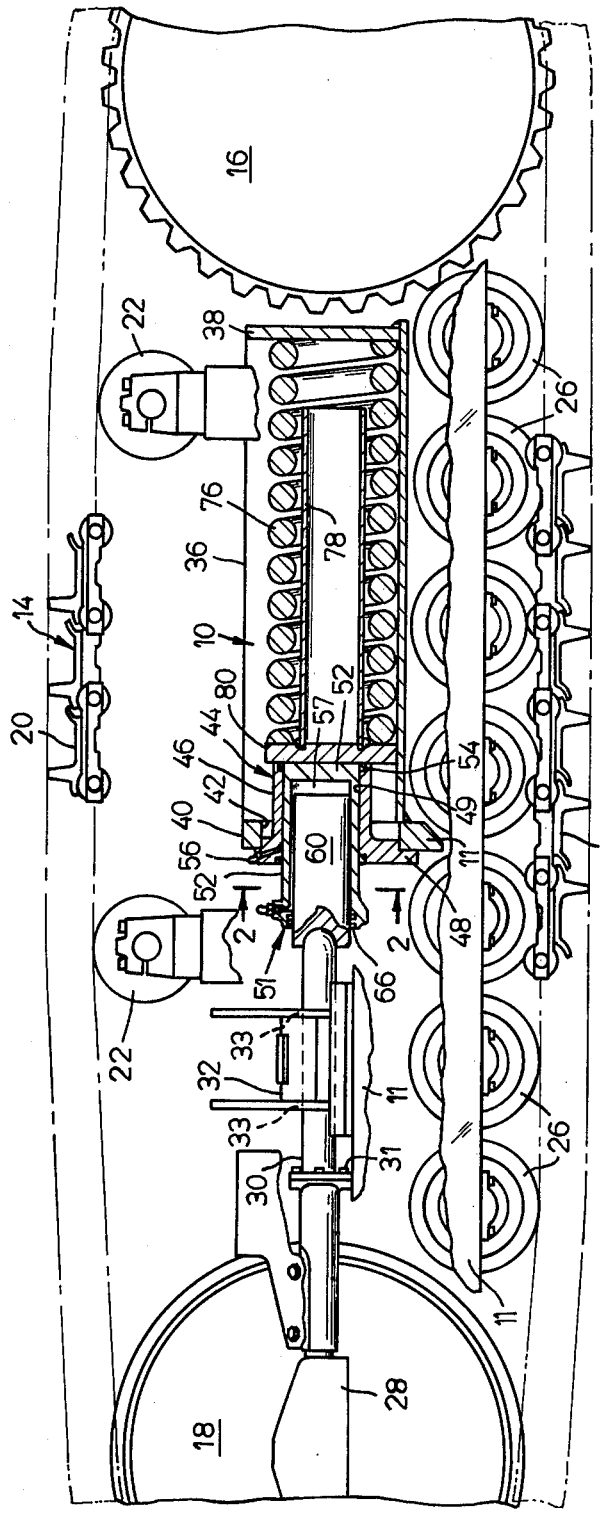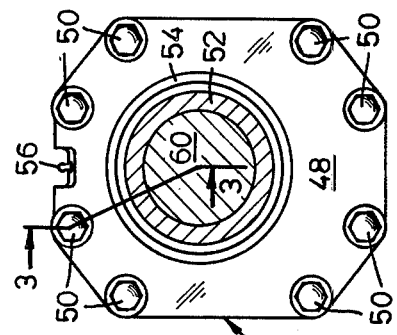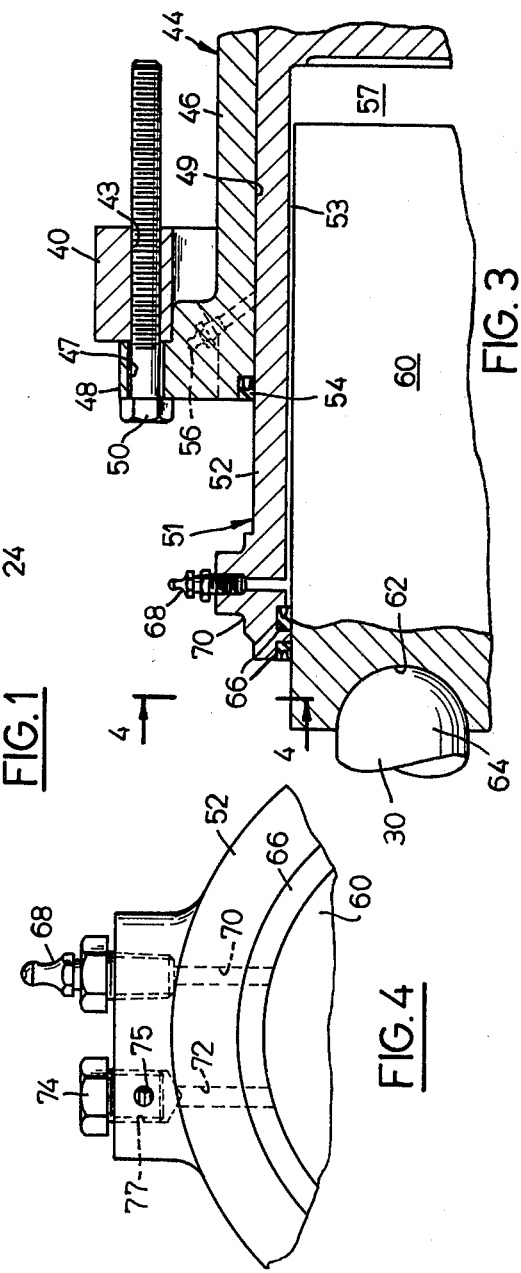

TRACK IDLER RECOIL SPRING ASSEMBLY AND METHOD FOR INSTALLATION AND REMOVAL

BACKGROUND OF THE INVENTION

1. Field of Use

This invention relates generally to a track idler recoil spring assembly for the endless track of a crawler type machine, such as a crawler tractor, and to a method for installing and removing the recoil spring thereof.

2. Description of the Prior Art

Some crawler type machines, such as crawler tractors, have an endless track trained around a track sprocket, a track idler and a series of supporting track rollers, all of which are rotatably supported on the tractor track frame. In some cases the track idler is mounted on an idler yoke which, in turn, is mounted for longitudinal sliding movement on the track frame to enable the track idler to move toward the track sprocket upon deflection of the track, as when objects are trapped between the track and the sprocket, the idler or a roller. The longitudinal movement of the idler yoke is resisted by means of a coiled, preloaded compression type recoil spring which is part of a track idler recoil spring assembly. Heretofore, it was the practice to provide the spring assembly for installation on the tractor with the spring already installed therein in preloaded or precompressed condition. Mounting of the spring in the spring assembly during manufacture required a specially adapted press to preload the spring means to maintain the spring compressed in the spring assembly during subsequent storage, handling and shipment of the assembly prior to installation on the vehicle. Because of the extremely high energy stored in the spring, the assembly constituted a potentially dangerous item. Failures in components of the assembly during storage and handling, sometimes attributable to improper materials or improper heat treatment of the bolts or bolt seats, have caused the assembly to literally explode. Furthermore, such preloaded spring assemblies often required special tools, if the assembly or the recoil spring thereof was to be installed on or removed from a vehicle in the field rather than in the factory.

SUMMARY OF THE PRESENT INVENTION

A crawler tractor has an endless flexible track trained around a driven track sprocket and around a track idler which is rotatably mounted on a track idler yoke which, in turn, is mounted on the tractor track frame for longitudinal movement. A track idler recoil assembly is mounted on the track frame between the track sprocket and track idler for resiliently resisting longitudinal movement of the yoke-mounted track idler toward the track sprocket caused by track deflection. A rigid pushrod is detachably connected to the idler yoke by removable capscrews and extends toward the recoil assembly through a hole in a rigid portion of the track frame, such as an equalizer beam support which is rigidly mounted on the trackframe. The assembly comprises a spring housing, closed at one end and open at the other, rigidly secured to the tractor trackframe; a coiled compression type recoil spring disposed within the spring housing between the closed end thereof and a pushplate in the housing; and a ram to transmit force between the free end of the pushrod and the pushplate at the end of the spring and to enable installation and removal of the spring in uncompressed condition. Spring restraining means on the spring housing slideably support the ram and are adjustably movable axially of the housing to hold the spring in a precompressed condition. The spring restraining means takes the form of a hollow cylindrical guide member which extends into the open end of the spring housing and is secured thereto by long bolts or capscrews. When fully installed and ready for operation, the ram is partially filled with hydraulic fluid so that it is extended and bears against the pushrod and the pushplate thereby forming an incompressible link between them. When the track deflects, the track idler, the idler yoke, the pushrod, the ram, the pushrod and pushplate move longitudinally as a unit against the force of recoil spring which resiliently resists such movement. The ram, although functioning as an incompressible link during track deflection, can be extended and retracted to facilitate installation and removal of the recoil spring in an unloaded condition.

During installation, the uncompressed spring is placed in the housing between the closed end thereof and the pushplate and the ram is placed in the spring restraining means between the pushplate at the end of the spring and a rigid portion of the track frame, such as the equalizer beam support. The ram is then extended to compress the spring and the spring restraining means is moved axially by means of taking up on its bolts into engagement with the pushplate adjacent the compressed spring and is then secured in a fixed position to hold the spring in precompressed condition. The ram is then retracted and the pushrod is secured to the idler yoke, whereupon the ram is again re-extended to engage the pushrod and the spring to serve as an incompressible link for transmission of force.

During removal, the ram is retracted, the pushrod is removed, the ram is re-extended between the pushplate at the end of the spring and the rigid portion of the track frame to hold the spring compressed while the spring restraining means are moved axially out of engagement with the pushplate, and the ram is then retracted to decompress the spring.

A track idler recoil spring assembly in accordance with the present invention offers numerous advantages over prior art track idler recoil spring assemblies and methods for installing or removing the same. For example, the assembly and method in accordance with the present invention result in increased safety in the manufacturing plant due to the fact that assemblies with dangerous preloaded springs need not be stored, handled or mounted on a vehicle. Furthermore, special presses and related equipment for preloading the spring of the spring assembly are eliminated. Increased safety results in the field as a result of elimination of the need to remove, handle, disassemble, reassemble or store assemblies. Furthermore, the need for special tools in the field is also eliminated, since installation and removal of the spring assembly in accordance with the present invention requires, for example, only standard small tools, such as hand wrenches and grease guns. The assembly and method in accordance with the present invention results in cost reductions due to the fact that a relatively simpler overall assembly is provided, and inventory and storage space requirements are reduced, since fully assembled preloaded spring assemblies need not be stored in readiness for use. Lead time required for manufacture of vehicles employing assemblies in accordance with the present invention is reduced since the step of assembling and storing preloaded spring assemblies is eliminated.

DESCRIPTION OF THE DRAWINGS

FIG. 1 is a side elevation view of a portion of a crawler-type tractor which is provided with a track idler recoil spring assembly embodying the invention;

FIG. 2 is an enlarged end elevation view of the assembly taken on line 2—2 of FIG. 1;

FIG. 3 is an enlarged cross section of a portion of the assembly taken on line 3—3 of FIG. 2;

FIG. 4 is an enlarged elevation view of a portion of the assembly taken on line 4—4 of FIG. 3.

DETAILED DESCRIPTION

Figure 5:
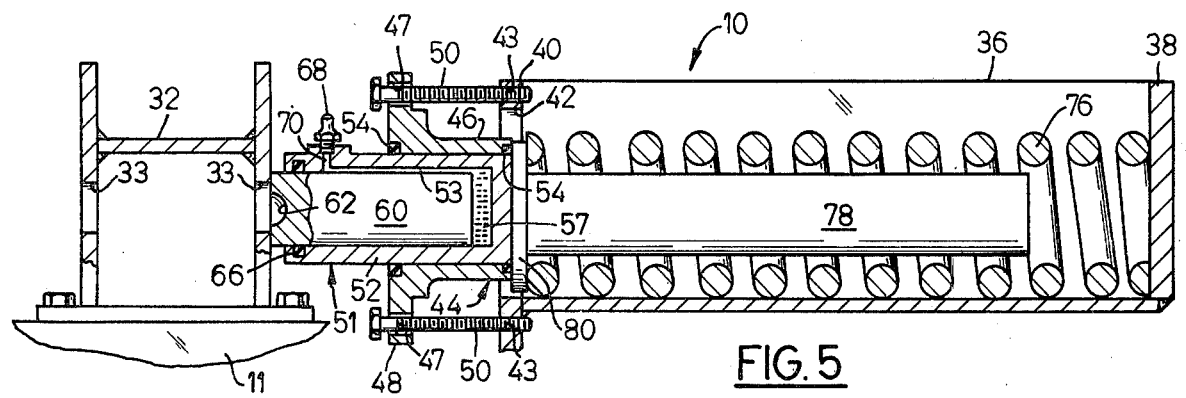
FIGS. 5 through 8 are schematic cross section views showing components of the recoil spring assembly in various positions, while the spring is being loaded or unloaded, as during installation or removal from a crawler tractor.

Referring to FIG. 1, a track idler recoil assembly 10 in accordanace with the invention is supported on a track frame 11 of a crawler tractor in association with one of the track laying mechanisms of the tractor. The track laying mechanism includes an endless flexible track 14 trained around a driven track sprocket 16 and a track idler 18. The upper flight 20 of track 14 is supported between sprocket 16 and idler 18 by means of a pair of track carrier rollers 22 mounted on track frame 11 and the lower flight 24 of track 14 is guided by a plurality of closely spaced track rollers 26 mounted on track frame 11. Sprocket 16 is rotatably driven about a fixed axis and track idler 18 is rotatably supported on a track idler yoke 28 which is mounted for movement longitudinally of the crawler tractor toward drive sprocket 16 upon deflection of flight 24 of track 14 as the tractor passes over irregular terrain or as material becomes lodged between track 14 and the track rollers 26, sprocket 16 or track idler 18. Any such longitudinal movement of track idler 18 towards track sprocket 16 is transmitted through track idler yoke 28 to a rigid pushrod 30 which is detachably connected to the yoke by bolts or capscrews 31. Pushrod 30 extends through holes 33 in a support member 32 for an equalizer beam, which member is rigidly connected to track frame 11 of the tractor. Axial movement of pushrod 30 toward track sprocket 16 is resiliently resisted by track idler recoil spring assembly 10 which is located between sprocket 16 and track idler 18.

As FIG. 1 shows, recoil spring assembly 10 includes a spring housing 36 which is rigidly supported in fixed position on track frame 11. Housing 36 is closed at one end by a rigid end wall plate 38 and is provided at its other end with a wall plate 40 having a centrally located opening 42 therethrough. A combined spring retaining member and ram support 44 is provided at the open end of spring housing 36. Member 44 comprises a tubular portion 46 and an exterior flange 48 at one end thereof and is positioned so that tubular portion 46 extends through opening 42 in plate 40 into spring housing 36. Flange 48 of member 44 is detachably connected to plate 40 by means of a plurality of long bolts or capscrews 50 which extend through untapped holes 47 in flange 48 and screw into tapped holes 43 in plate 40. Member 44 is axially movable inwardly or outwardly of spring housing 36 by means of the bolts 50 so as to maintain a desired amount of pressure on spring 76, as hereinafter explained.

Besides serving as a spring retaining member, member 44 supports a hydraulic ram 51 which comprises a relatively movable cylinder 52 and a piston 60 therein. Ram 51 operates to preload and unload spring 76 during installation and removal and also serves as an incompressible link to transmit force between pushrod 30 and spring 76, as hereinafter explained. Cylinder 52 is slideably supported in the internal bore 49 of tubular portion 46 of member 44. Seals 54 are provided at opposite ends of bore 49 for sealing engagement with the exterior of cylinder 52. A lubrication fitting 56, shown in FIGS. 2 and 3, communicates with bore 49 between the seals 54 for the introduction of lubricant to insure free sliding movement of ram cylinder 52 relative to member 44. Cylinder 52 slideably receives piston 60 and the clearance space 53 between the sides of cylinder 52 and piston 60 is on the order of ten-thousandths of an inch so that hydraulic fluid in the form of grease can be forced therethrough to or from the larger cavity 57 defined between the ends of the cylinder and piston. Referring to FIG. 3, sealing means in the form of two sealing rings 66 is positioned adjacent the open end of cylinder 52 for sealing engagement with piston 60. A fitting 68 is provided for admitting hydraulic fluid in the form of heavy oil or grease to cavity 57 in ram 51 to extend the ram. Fitting 68 is threadably mounted in a radially extending passage 70 in cylinder 52 and the passage communicates through clearance space 53 to cavity 57 in ram 51. As FIG. 4 shows, means are also provided for allowing controlled expulsion of fluid from cavity 57 in ram 51. Such means comprise a radially extending passage 72 formed in the wall of cylinder 52 and which terminates in an enlarged threaded opening 77 which accommodates a threaded screw 74. Another passage 75 intersects opening 77 and communicates with the exterior of cylinder 52. The opening 77 and the passage 75 are normally closed by screw 74 which can be screwed in or out to prevent or control the rate of explusion of fluid from cavity 57 within cylinder 52 through space 53. Piston 60 has a concave recess 62 at its free end for receiving a complementary, convex end portion 64 of pushrod 30 in abutting relationship thereto.

The coiled compression spring 76, shown in preloaded condition in FIG. 1, is disposed in housing 36 around a guide tube 78 which has a pushplate 80 secured to one end thereof as by welding. Spring 76 has one end seated against end wall plate 38 of housing 36 and has its opposite end engaged with pushplate 80 to force the latter into engagement with the inner end of restraining member 44.

As FIG. 1 makes clear, in the installed condition of spring assembly 10, spring 76 is preloaded or precompressed so that a substantial force is required to cause additional compression or deflection. During operation of the crawler tractor, deflection of track 14 imposes a load on track idler 18 tending to move it to the right (with respect to FIG. 1) toward track sprocket 16. Such movement is transmitted through idler yoke 28, pushrod 30 and ram 31, which move as a unit, to pushplate 80 to be resiliently absorbed by preloaded recoil spring 76. After the condition which causes deflection of flight ceases, spring 76 serves to bias ram 31, pushrod 30, idler yoke 28 and track idler 18 to the left (with respect to FIG. 1).

The method of installing, preloading, unloading and removal of spring 76 of assembly 10 will best be understood by reference to FIGS. 5 through 8.

Installation of recoil spring 76 is carried out as follows. Assume that spring housing 36 is already rigidly secured to track frame 11 of the tractor. Further assume that pushrod 30 is disconnected from yoke 28 and withdrawn from the holes 33 in the equalizer beam support 32. Also assume that retainer member 44 is attached to housing 36 by bolts 50 and that it is disposed in its outwardmost position as shown in FIG. 5. Also assume that hydraulic ram 51 is in its fully retracted condition and that screw 74 is in fully closed position. Recoil spring 76 is then disposed in housing 36 through the open upper side thereof in unloaded condition with guide tube 78 and pushplate 80 associated therewith as shown in FIG. 5.

It will be apparent that assembly 10 with its components already assembled and arranged as above described could be attached to the track frame 11 of the tractor. Or, if preferred, guide tube 78 with spring 36 disposed therearound could be dropped into housing 36 from the top, either before or after attachment of the retainer member 44 and ram 51 and after housing 36 is secured to track frame 11.

When uncompressed recoil spring 76 is in place, hydraulic fluid is forced under high pressure through fitting 68 into cavity 57 of ram 51 to extend cylinder 52 and piston 60 relative to each other to bring the free end of piston 60 into engagement with the equalizer beam support 32 and the closed end of cylinder 52 into engagement with pushplate 80, as FIG. 5 shows. Up until this point spring 76 is still in its completely relaxed condition and the various components occupy the positions shown in FIG. 5.

Figure 6:
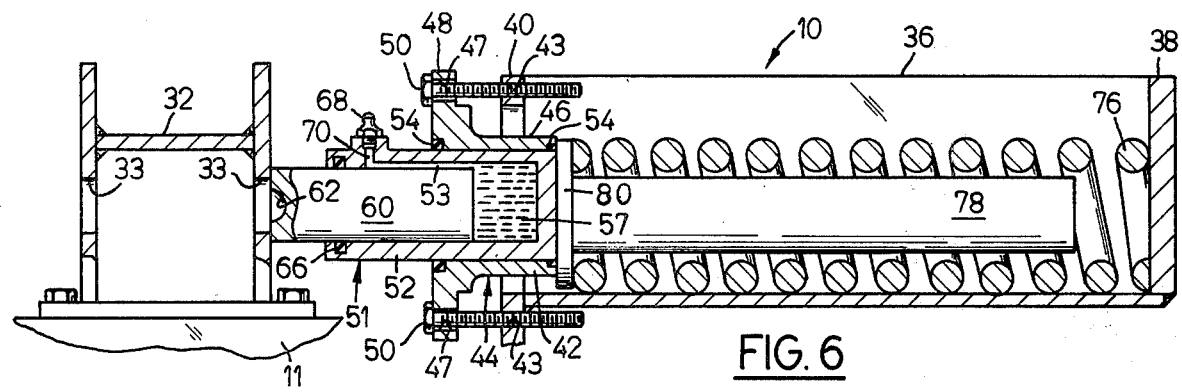

Referring now to FIG. 6, the further introduction of pressurized fluid into cavity 57 of ram 51 causes further extension of piston 60 and cylinder 52 relative to each other. The free end of the piston 60 acts against equalizer beam support 32 and the closed end of cylinder 52 at against pushplate 80 to partially compress spring 76. With the spring 76 partially compressed, pushplate 80 is moved out of engagement with retainer member 44 and the latter is then ready to be positioned axially inwardly of spring housing 36 so that the end of tubular portion 46 again comes into engagement with pushplate 80. This is accomplished by tightening bolts 50 to bring their head into engagement with flange 48. It is desirable to alternately extend ram 31 and retighten the bolts 50 at various intermediate stages during compression of spring 76 to the positions illustrated in FIGS. 6 and 7, to insure that the spring will not decompress in the event there is a loss of the pressurized fluid within cavity 57 of ram 51.

Figure 7:
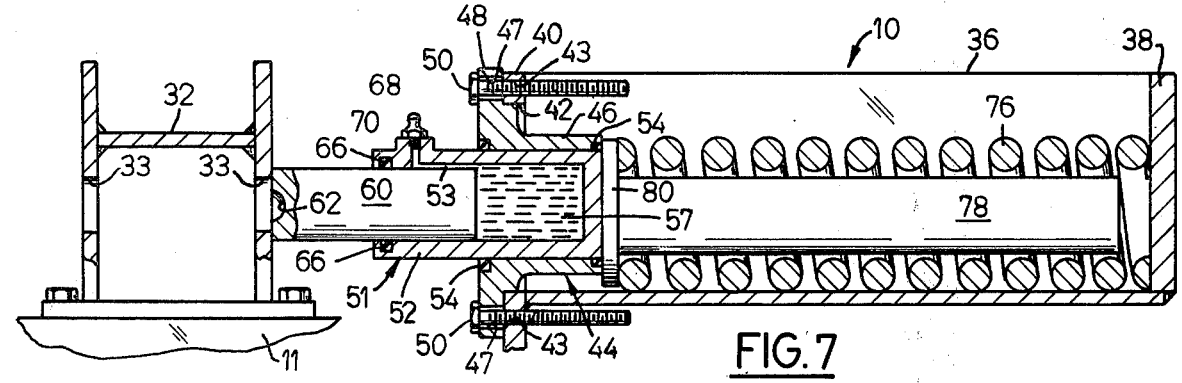

To fully preload spring 76, pressurized fluid added through fitting 68 until ram 51 is extended sufficiently beyond the position shown in FIG. 6 until spring 76 is compressed to its preloaded position, as shown in FIG. 7, at which time retaining member 44 is moved axially inward of housing 36 until flange 48 of member 44 is in abutment with plate 40 of housing 36 and the bolts 50 are tightened to maintain retainer member 44 in its innermost fixed position relative to housing 36.

After retainer member 44 is secured in its innermost fixed position and spring 76 is precompressed, ram 51 is retracted by unscrewing screw 74 to a degree necessary to allow the relatively large volume of fluid in space 57 of ram 51 to be expelled through fluid expulsion hole 75 as piston 60 is pushed into cylinder 52. After all fluid is expelled from ram 51 and cylinder 60 is fully retracted into cylinder 52, the pushrod 30 is installed through holes 33 in equalizer beam support 32 and connected to the yoke 28 by means of the bolts 31.

Figure 8:
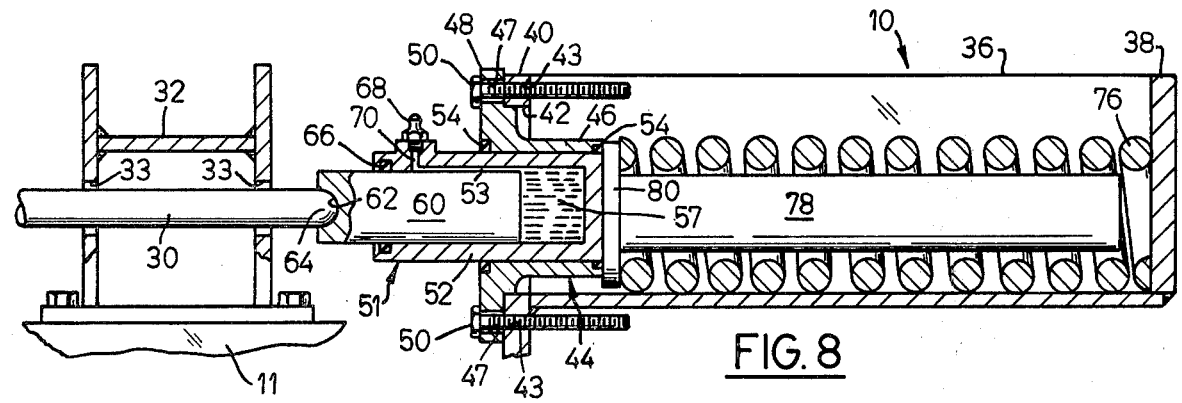

Subsequently, as FIG. 8 makes clear, fluid expulsion hole 75 is again reclosed by screw 74 and fluid is forced through fitting 68 to extend ram 51 for such distance as is necessary to insure that concave recess 62 on piston 60 seats on end 64 of pushrod 30 and so that the closed end of piston 52 is in engagement with pushplate 80. Piston 60, cylinder 52 and the quantity of fluid within space 57 of cylinder 51 serve to form a solid link so that loads imposed on pushrod 30 by yoke 28 tending to move the pushrod will be transmitted through ram 51 to pushplate 80 to compress recoil spring 76 and so that spring recoil forces will be transmitted in the opposite direction.

Decompression of recoil spring 76 is accomplished by operating screw 74 to open fluid expulsion hole 75 to allow fluid to be expelled from cavity 57 so that piston 60 can be fully telescoped into cylinder 52 to permit the removal of pushrod 30. After pushrod 30 is removed, fluid expulsion hole 75 is reclosed by screw 74 and sufficient fluid is reintroduced through fitting 68 to extend ram 51 and bring the closed end of cylinder 52 into engagement with pushplate 80 and the free end of piston 60 into engagement with equalizer beam support 32, as shown in FIG. 7. Sufficient fluid may be added to cavity 57 within ram 51 so as to slightly compress spring 76 and remove the load imposed by the latter on the bolts 50. Thereafter, the bolts 50 may be partially withdrawn to allow spring retainer member 44 to be moved axially outwardly of housing 36 to an intermediate position, as shown, for example, in FIG. 6. Subsequently, screw 74 is backed off to partially open fluid expulsion hole 75 and allow controlled expulsion of fluid from cavity 57 of ram 51 as spring 76 reacts between end wall 38 and pushplate 80 to gradually telescope the piston 60 into cylinder 52. Thus, spring 76 gradually decompresses or unloads. When flange 48 or retainer member 44 comes into engagement with the heads of the partially retracted bolts 50, as shown in FIG. 6, screw 74 is retightened to reclose passage 75 and stop fluid expulsion. Then, while ram 51 holds spring 76 partially compressed the bolts 50 are fully retracted and member 44 is moved to the position shown in FIG. 5. Subsequent operation of screw 74 releases the pressurized fluid from within ram 51 and permits spring 76 to force piston 60 into cylinder 52 and to move to its fully relaxes condition. The spring 76, together with guide tube 78 and pushplate 80, may then be removed from housing 36 for replacement or repair.

It is apparent that a track idler recoil spring assembly in accordance with the invention may be assembled, disassembled, mounted on or removed from the tractor without the need for specialized tools and by utilizing tools which normally would be available. All that is required is a means to inject pressurized fluid, and a wrench for the bolts 50 and cap 74. Moreover, spring 76 may be installed and removed in relaxed condition without endangering personnel and without the need to have it preloaded in its housing at the factory.

We claim:
1. In an endless track type machine having an endless flexible track trained around a sprocket and around a track idler which is movable upon deflection of said track, a track idler recoil assembly for resiliently resisting said movement of said track idler and comprising:
   a recoil spring having an unloaded state and being initially compressible to a preloaded state;

means including a selectively extendable and retractable hydraulic ram disposed between said track idler and said recoil spring, said hydraulic ram being extendable to initially preload said spring to place it in readiness for operation, said hydraulic ram being retractable to unload said spring to facilitate its removal from said assembly;

means on said hydraulic ram to maintain it in extended position whereby said hydraulic ram serves as an incompressible force transmitting link between said track idler and said spring when the latter is preloaded;

a pair of members between which said spring is disposed, at least one of said members being adjustably movable relative to the other member between one position wherein said spring can assume its unloaded state and another position wherein said one member maintains said spring preloaded after said hydraulic ram is extended to initially preload said spring; and at least one threaded member for releasably securing said one member in its said one position or other position or any position therebetween.

2. In an endless track type machine including a track frame and having an endless flexible track trained around a sprocket and around a track idler which is movable upon deflection of said track, a track idler recoil assembly for resiliently resisting said movement of said idler and comprising:

a recoil spring having an unloaded state and being initially compressible to a preloaded state;

means including a detachable pushrod and a selectively extendable and retractable hydraulic ram disposed between said idler and said recoil spring, said pushrod being connected to transmit force between said idler and said ram, said hydraulic ram being extendable between a portion of said track frame and said spring when said pushrod is detached to initially preload said spring to place it in readiness for operation, said hydraulic ram being retractable to unload said spring to facilitate its removal from said assembly;

means on said hydraulic ram to maintain it in extended position whereby said hydraulic ram serves as an incompressible force transmitting link between said pushrod and said spring when the latter is preloaded;

a pair of members between which said spring is disposed, at least one of said members being adjustably movable relative to the other member between one position wherein said spring can assume its unloaded state and another position wherein said one member maintains said spring preloaded after said hydraulic ram is extended to initially preload said spring; and at least one threaded member for releasably securing said one member in its said one position or other position or any position therebetween.

3. A machine according to claim 2 wherein said ram has relatively movable piston and cylinder members and is disposed between said pushrod and said recoil spring; and including means for supplying and removing incompressible fluid to and from said cylinder; and means for maintaining a fixed volume of incompressible fluid in said ram cylinder to maintain said piston and ram cylinder in relatively fixed, partially extended positions relative to each other during movement of said track idler.

4. In an endless track type machine having a track frame and having an endless flexible track trained around a sprocket and around a track idler mounted on an idler yoke which is movable upon deflection of said track, a track idler recoil assembly for resiliently resisting said movement of said track idler yoke and comprising:

a spring housing mounted on said track frame;

a recoil spring having an unloaded state and capable of being initially compressible to a preloaded state disposed in said spring housing;

means between said idler yoke and said spring and comprising a pushrod detachably connected to said idler yoke and a selectively extendable and retractable hydraulic ram engageable with said pushrod, said hydraulic ram being extendable between a portion of said track frame and said spring when said pushrod is detached to initially preload said s spring to place it in readiness for operation, said hydraulic ram being retractable to unload said spring to facilitate its removal from said assembly;

means on said hydraulic ram to maintain it in extended position whereby said hydraulic ram serves as an incompressible force transmitting link between said pushrod and said spring when the latter is preloaded;

a movable member on said spring housing which is adjustably movable between one position wherein said spring can assume its unloaded state and another position wherein said member maintains said spring preloaded after said hydraulic ram is extended to initially preload said spring; and at least one threaded member for releasably securing said one member in its said one position or other position or any position therebetween.

5. A machine according to claim 4 wherein said ram has relatively movable piston and cylinder members and is disposed between said pushrod and said recoil spring; and including means for supplying and removing incompressible fluid to and from said cylinder; and means for maintaining a fixed volume of incompressible fluid in said ram cylinder to maintain said piston and ram cylinder in relatively fixed, partially extended positions relative to each other during movement of said track idler yoke.

6. In an endless track type machine having a track frame and having an endless flexible track trained around a sprocket and around a track idler mounted on an idler yoke, which yoke is movable upon deflection of said track, a track idler recoil assembly for resiliently resisting said movement of said track idler yoke and comprising:

a spring housing mounted on said track frame and having a closed end and an open end;

a recoil spring having an unloaded state and capable of being initially compressible to a preloaded state disposed in said spring housing;

spring retaining means releasably secured at said open end of said housing and movable axially with respect to said housing between one position wherein said spring can assume its unloaded state and another position wherein said spring retaining means maintains said spring preloaded;

means between said idler yoke and said spring comprising a pushrod detachably connected to said idler yoke and a selectively extendable and retractable hydraulic ram engageable with said pushrod, said hydraulic ram being slideably mounted on said spring retaining means, said pushrod extending through an opening in a member rigidly secured to said track frame between said idler yoke and said ram, said hydraulic ram being extendable between said member and said spring when said pushrod is detached to initially preload said spring to place it in readiness for operation, said hydraulic ram being retractable to unload said spring to facilitate its removal from said assembly;

means on said hydraulic ram to maintain it in extended position whereby said hydraulic ram serves as an incompressible force transmitting link between said pushrod and said spring when the latter is preloaded; and at least one threaded member for releasably securing said spring retaining means in said one position or other position or any position therebetween.

7. In a crawler tractor:

a track frame;

a drive sprocket mounted for rotation with respect to said track frame;

an idler yoke mounted for longitudinal movement on said track frame;

a track idler mounted for rotation on said yoke;

an endless flexible track trained around said sprocket and around said track idler, said yoke being movable longitudinally toward drive sprocket upon deflection of said track;

a spring housing mounted on said track frame and having a closed end and an open end;

a coiled compression type recoil spring for resiliently resisting said movement of said yoke disposed in said spring housing and adapted to have one end bear against said closed end of said housing, said spring having an unloaded state and capable of being preloaded;

spring retaining means extendable inwardly in said open end of said spring housing and movable axially with respect to said housing between one position wherein said spring assumes its unloaded state and another position wherein said spring retaining means maintains said spring preloaded;

means between said idler yoke and said spring and comprising a pushrod detachably connected to said idler yoke and a selectively extendable and retractable hydraulic ram engageable with said pushrod, said hydraulic ram being slideably mounted on said spring retaining means, a member rigidly secured to said track frame between said idler yoke and said ram and having an opening for accommodating extension of said pushrod therethrough, said hydraulic ram being extendable between said member and said spring when said pushrod is detached to initially preload said spring to place it in readiness for operation, said hydraulic ram being retractable to unload said spring to facilitate its removal from said assembly;

means on said hydraulic ram to maintain it in extended position whereby said hydraulic ram serves as an incompressible force transmitting link between said pushrod and said spring when the latter is preloaded;

and means including at least one capscrew for releasably securing said spring retaining means in said one position or other position or any position therebetween.

8. A tractor according to claim 7 wherein said ram comprises relatively movable piston and cylinder members and including means for supplying and removing incompressible fluid to and from said cylinder; and means for maintaining a fixed volume of incompressible fluid in said ram cylinder to maintain said piston and ram cylinder in relatively fixed, partially extended positions relative to each other during movement of said track idler yoke.

9. A method of preloading and connecting a track idler recoil spring which is disposed between the track idler and one fixed portion of an endless track type machine comprising the steps of:

positioning a hydraulic ram between said spring while the latter is unloaded and another fixed portion of said machine;

extending said ram to initially preload said spring;

securing said spring in preloaded condition against said one fixed portion;

retracting said ram;

positioning a rigid pushrod between said ram and said track idler; and re-extending said ram to provide an incompressible link between said pushrod and said spring.

10. A method of installing and compressing a recoil spring between a longitudinally movable idler yoke and a first fixed member on a crawler type machine comprising the steps of:

positioning said spring in a relaxed state between said first fixed member and a second member on said machine which is repositionable to a fixed position with respect to said first member;

positioning a hydraulic ram between said spring and a third fixed member on said machine;

introducing incompressible fluid under pressure into said ram to effect extension thereof and initial compression of said spring;

repositioning said second member to place it in abutment with said spring in its said fixed position to maintain said spring compressed;

removing fluid from said ram to effect retraction thereof;

disposing a rigid pushrod between said ram and said yoke;

and reintroducing fluid incompressible under pressure into said ram to effect extension thereof and to cause said ram to provide an imcompressible link between said pushrod and said spring.

* * * * *